Figure 3:
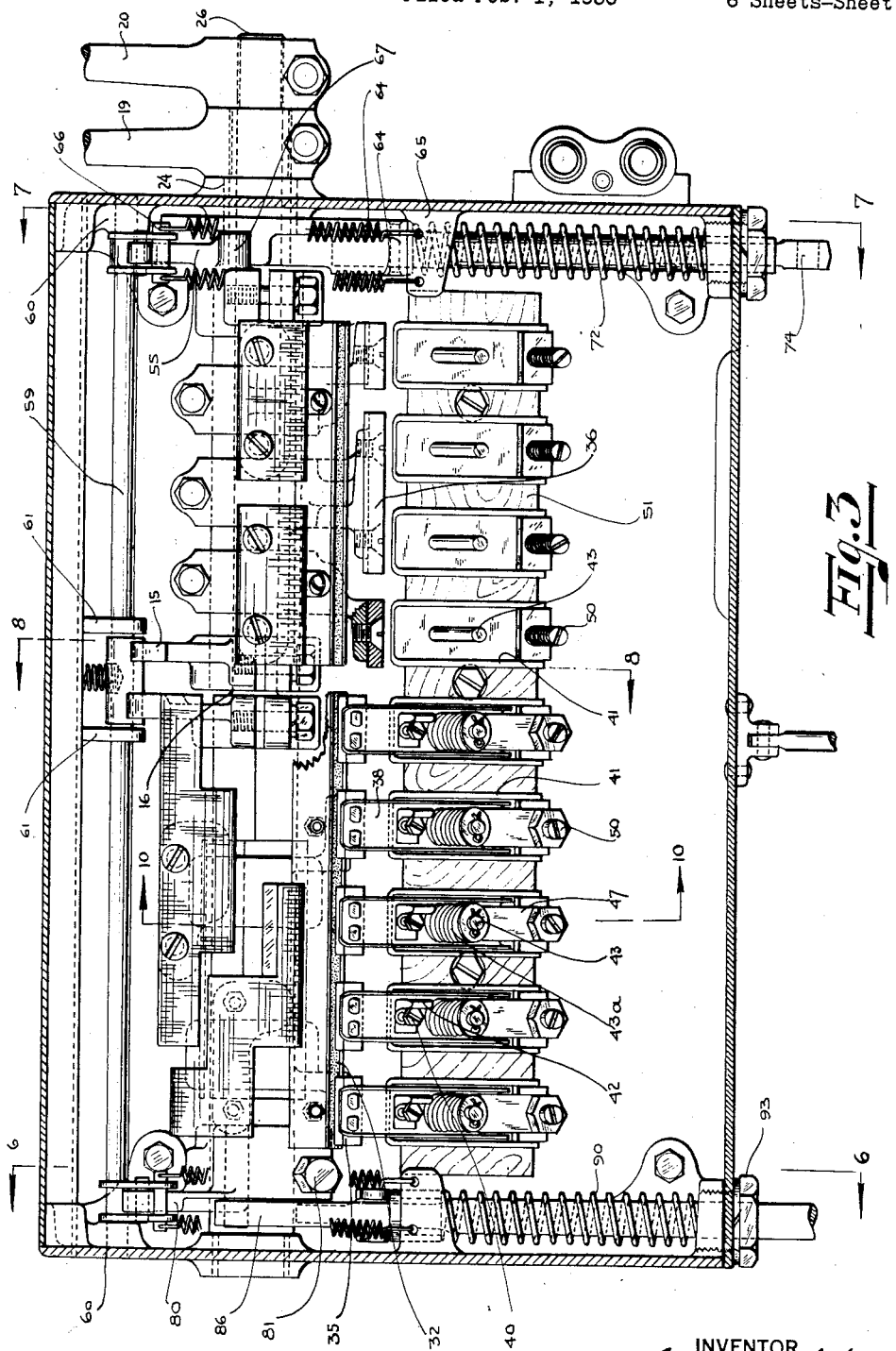

Oct. 5, 1937.  C. SCHROEDER  2,094,851
FOOT OPERATED CONTROLLER
Filed Feb. 1, 1936  6 Sheets-Sheet 1
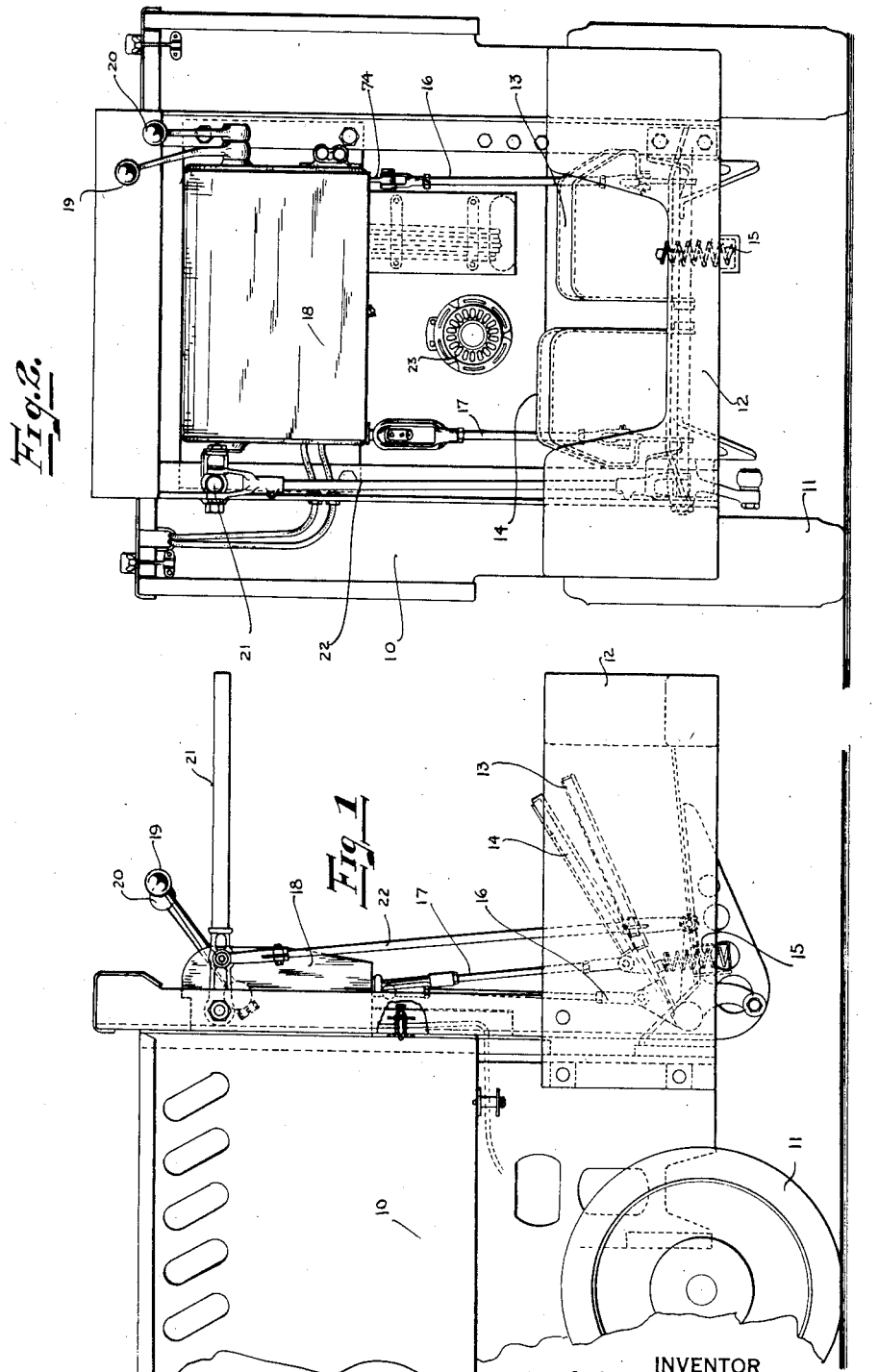
INVENTOR
Charles Schroeder
BY
A.H. Golden
ATTORNEY Oct. 5, 1937.　　　　C. SCHROEDER　　　　2,094,851
FOOT OPERATED CONTROLLER
Filed Feb. 1, 1936　　　　6 Sheets-Sheet 2

INVENTOR
Charles Schroeder
BY
A.H. Golden
ATTORNEY

Oct. 5, 1937.  C. SCHROEDER  2,094,851
FOOT OPERATED CONTROLLER
Filed Feb. 1, 1936  6 Sheets-Sheet 3
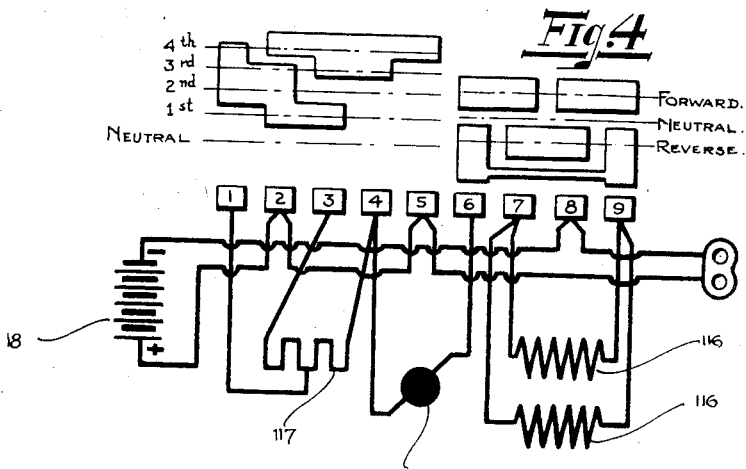
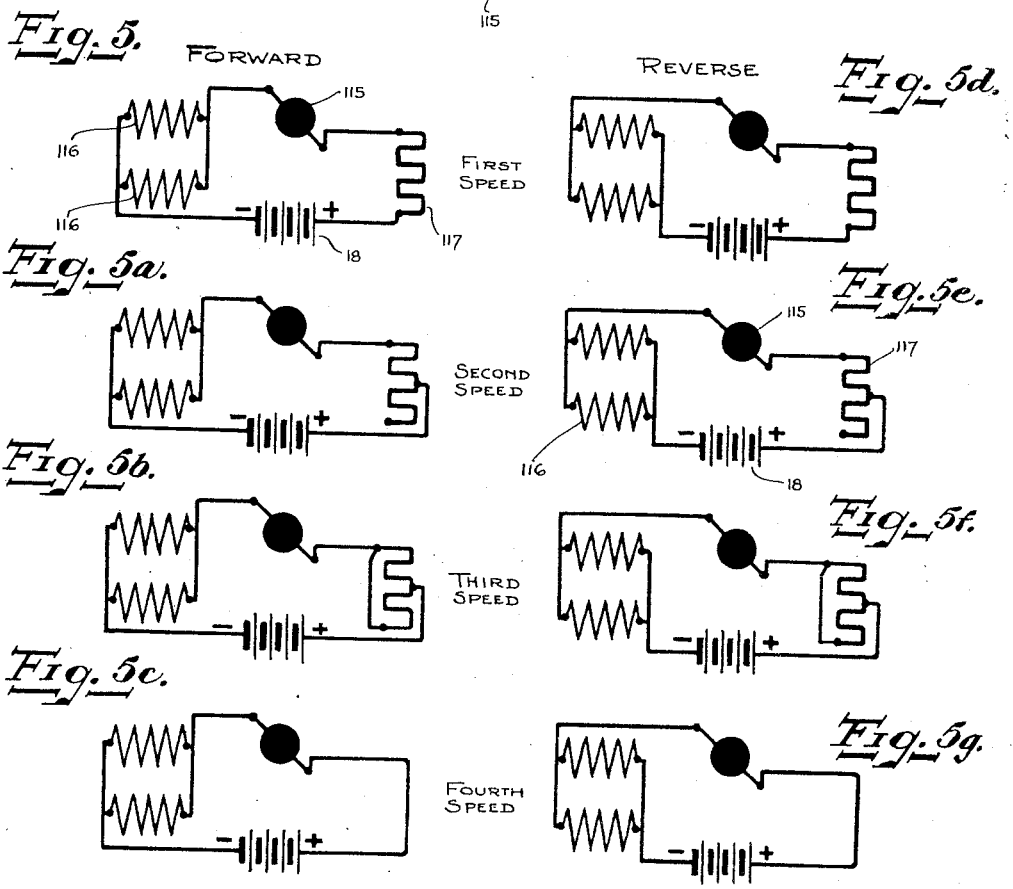
INVENTOR
Charles Schroeder
BY
A. H. Golden
ATTORNEY

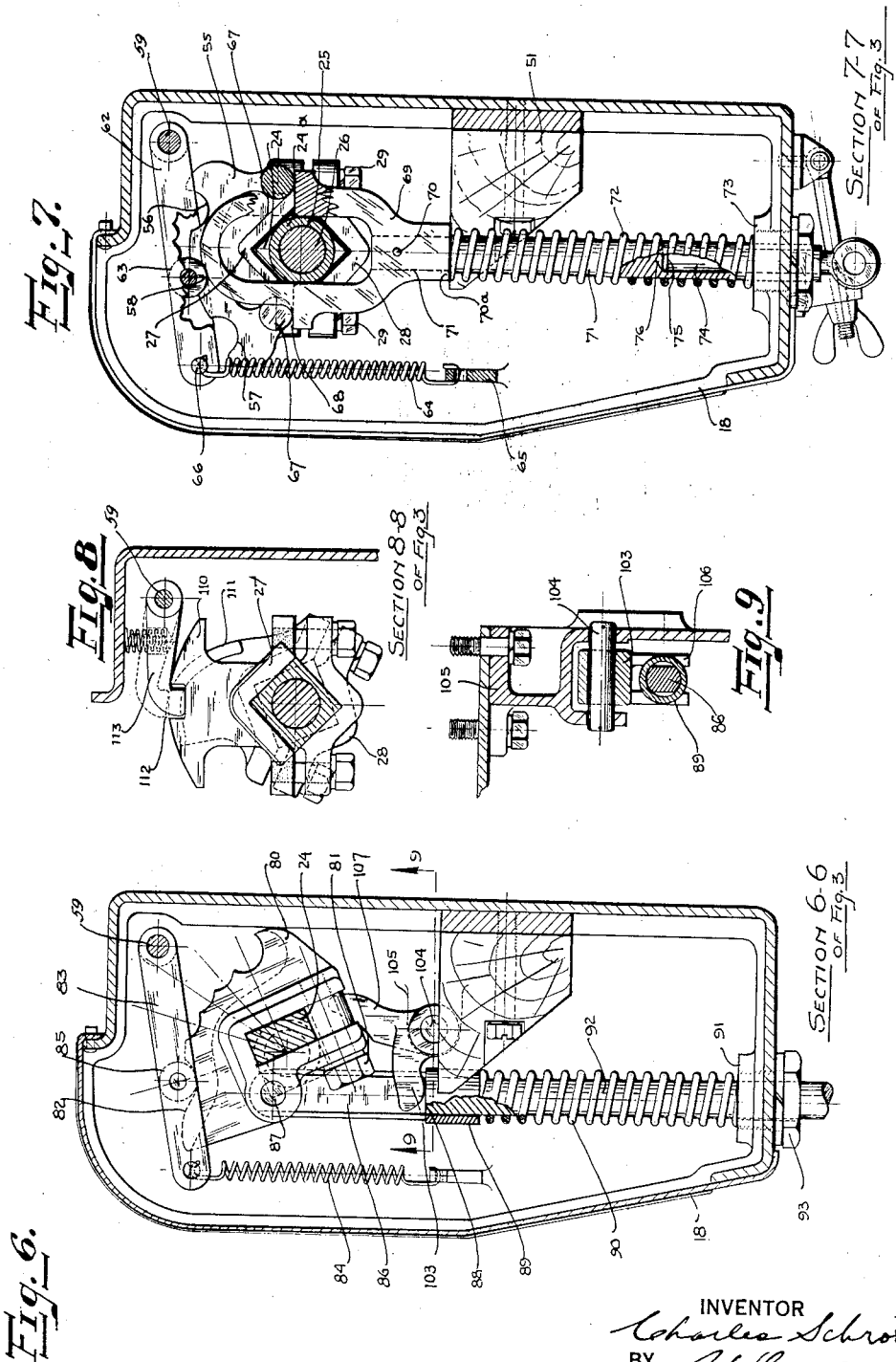

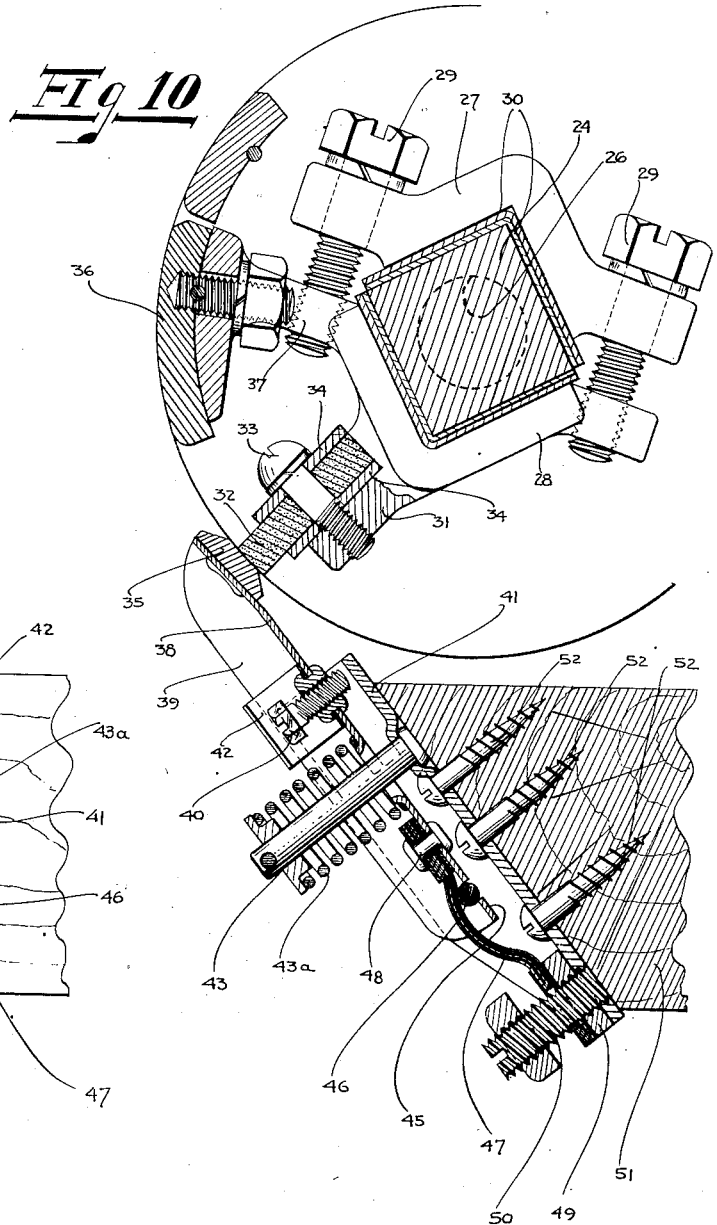

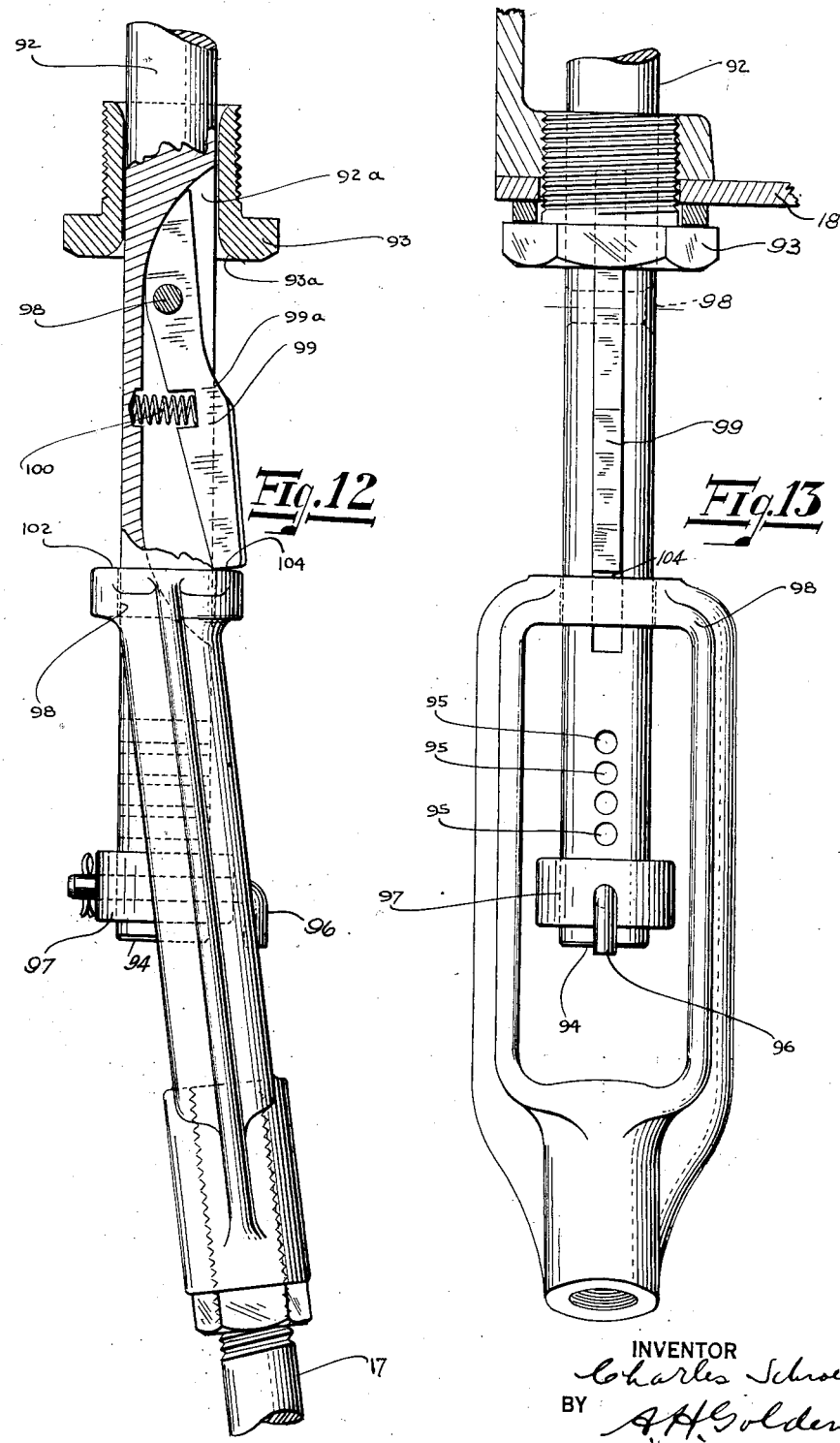

Patented Oct. 5, 1937

2,094,851

UNITED STATES PATENT OFFICE 2,094,851

FOOT-OPERATED CONTROLLER

Charles Schroeder, Philadelphia, Pa., assignor to The Yale & Towne Manufacturing Company, Stamford, Conn., a corporation of Connecticut Application February 1, 1936, Serial No. 61,951

21 Claims. (Cl. 200—18)

This invention relates to a controller for an electric industrial truck. While most of the features of this invention are especially applicable for use in a controller of this type, there are features which are generally useful in controllers of various types, so that in claiming the invention, I shall not limit myself to the application of the controller solely to an electric industrial truck.

An electric industrial truck usually requires a controller having a direction controlling drum and a speed controlling drum. The direction controlling drum is generally known in the industry as a reversing drum. In this specification, I shall use the terms "direction" and "reversing" interchangeably. The speed drum of the controller is usually constructed to allow for four speeds and a neutral position, while the direction controlling drum is adapted to have a forward portion and a reverse portion, in addition to a central or neutral point. It is standard practice in the art to provide means for locking the direction controlling drum against movement from neutral position to either forward or reverse position, unless the speed controlling drum is placed in neutral position. Those skilled in the art will appreciate the necessity for this construction, which construction is for the purpose of preventing the application of heavy current to the motor, except through the advancing of the motor through the various speeds.

Electric industrial trucks are designed and manufactured to stand a great deal of abuse and hard usage. It is necessary that a controller for use in electric industrial trucks, be so designed that the parts will stand hard usage, and operate properly over a period of years. This invention has as one of its important features, means for cushioning or easing the action of the speed and reversing drums, so as to protect them against undue injury and wear incidental to harsh service. As another important feature, my invention contributes a controller adapted for manipulation by the foot of the operator.

I should prefer now to describe generally some of the features which contribute to the easy and cushioned action of my controller, and to its special adaptation for operation by the foot, and will later on describe in detail with reference to the drawings, the detailed construction. The reversing or directional drum in my invention, is controlled dually by a hand lever and a foot pedal, this foot pedal being termed a safety or cutout pedal. When the operator stands on this foot pedal, it is possible, through means of the hand lever, to manipulate the reversing drum. Whenever the foot pedal is released, as when the operator lifts his foot, or in an emergency falls off the truck, a powerful spring pressing upwardly on the foot pedal causes it, through means of a rod, to rotate the controlling drum to its neutral position.

In the prior art, the reversing drum has generally been secured for integral movement with said pedal by a pedal actuating spring, so that the drum is returned with a harsh action to its neutral position. Instead of utilizing this integral movement, I preferably utilize the pedal and its spring to contribute an initial movement to the drum to release the usual detent means which are adapted to hold it in either its forward or reverse position. Thereafter, a lighter spring acts to return the controller fully to its neutral position. This action is exceedingly important in preventing undue wear and in easing and cushioning the action of the apparatus.

The speed controlling drum of my controller is controlled in a very novel manner by a foot pedal which acts through rods to move the drum against spring action, into any one of several speed positions, depending upon the degree of the depression of the pedal. It is quite obvious that it is most difficult to control, through the movement of the pedal, the positioning of the drum, since the operator will find it difficult to determine the degree of depression of the pedal which may be necessary to move the controller to a particular speed position. Therefore, I provide means whereby the depression of the pedal to a predetermined set position will move the controller into a predetermined speed position, depending upon the position of certain adjustable mechanism.

Preferably, the mechanism is so arranged that full depression of the pedal will be required, even though the controller drum may only be moved from neutral to the first speed by this full depression. In another position of the adjusting mechanism, the full depression of the pedal will move the controller from neutral to fourth speed. It is quite obvious, of course, that this mechanism may be so arranged that the foot pedal will move varying distances, depending upon which speed position of the controller drum is to be attained.

More in detail, the invention comprises a variable one way connection between the controller drum and the pedal so that the pedal may pick up the controller and move it through its entire range of movement, while the pedal itself is being moved through its entire range of movement; or the pedal may simply pick up the controller just before the said pedal reaches the end of its movement, so as to be effective to move the controller through only one speed, or perhaps two speeds, as the case may be. Also, as a feature of the foot pedal control, I may disconnect the foot pedal entirely so that the speed drum will be operable by hand means only. In all cases, however, when the foot pedal is connected to the speed drum, it is the pedal action which dominates the speed drum, and not the hand means.

The foot operated pedal is preferably arranged to be also the brake controlling pedal. I therefore utilize the variable one way connection just described to permit the depression of the pedal to first release the brake and then rotate the controller.

An important feature in connection with the speed drum is the feature whereby the speed drum is returned to neutral under such conditions that the return is cushioned in somewhat the manner of the reversing controller drum. In order to arrange for this cushioning of the speed drum, I utilize a star wheel on the speed drum which is controlled by a detent roller, which detent roller is spring pressed against the star wheel and maintains it yieldingly in a series of positions corresponding from neutral to fourth speed.

The pedal which I use for moving the speed drum, not only controls the said drum, but also controls the brake for the truck, and is naturally actuated by an exceedingly strong spring. I provide means whereby when the foot of the operator is removed from the pedal, this exceedingly strong spring will be capable of actuating the controller drum for only a short distance. Thereafter, a lighter spring will operate on the drum and exert a force against the force of the spring pressed detent roller as the roller moves in and out of the depressions of the star wheel. This lighter spring presses the star wheel into substantially a neutral position and with the detent roller in the neutral depression of the star wheel. Means are provided for relieving the compression of even the lighter controller moving spring at the point when the detent roller first enters the neutral depression of the star wheel. This places the star wheel and the controller solely under the control of the detent roller which, through cooperation with the star wheel, eases the controller into its neutral position. The importance of this construction will of course be quite clear to those skilled in the art.

The release of the pedal and its heavy spring from the controller when the controller is being moved to neutral, allows also for the extra movement required by the pedal to allow for the application of the brake, it being recalled the depression of the pedal first releases the brake.

The construction of my controller drum per se is quite novel and embodies the use of a plurality of arms secured on the controller shaft, one of the arms carrying oil soaked felt for cooperation with the contact fingers, while the other of the arms carries the contact segments. This contact finger construction is also of considerable importance and novelty since it embodies very light finger portions which will have no tendency to vibrate when forced against the contact segments of the drum.

Having now described generally my invention, I shall refer to the drawings and present hereinafter a detailed description of the invention.

In the drawings, Fig. 1 is a side view of the operating end of an industrial truck, while Fig. 2 is an end view of the operating end of an industrial truck. Fig. 3 is a front view of my controller with the cover removed. Fig. 4 is a wiring diagram of the controller, while Figs. 5 to 5g illustrate a series of circuit diagrams showing the relation of the circuits in the various speeds, both forward and reverse. Fig. 6 is a section along lines 6—6 of Fig. 3. Fig. 7 is a sectional view along lines 7—7 of Fig. 3. Fig. 8 is a view along lines 8—8 of Fig. 3. Fig. 9 is a partial section taken along lines 9—9 of Fig. 6. Fig. 10 is a section through the controller along lines 10—10 of Fig. 3 showing the construction of the contact fingers, the method of mounting the contact fingers, and the general construction of the drum. Fig. 11 is a partial view of Fig. 10 showing a front view of the fingers of Fig. 10. Figs. 12 and 13 are respectively side and front views of the means for operating the speed controlling drum by the foot pedal.

Referring now more particularly to the drawings and especially to Figs. 1 and 2, reference numeral 10 designates generally an electric industrial truck having driving wheels 11 and a driver's platform 12. Pivoted to this platform 12 is a pedal 13 which may be termed a safety cut-out pedal, and which controls the reversing drum, or the direction controlling drum, as it may otherwise be termed. There is provided on the platform a further pedal 14 which may be termed a brake pedal and foot speed control pedal, and which is adapted to release the brake when moved downwardly, and also to operate the speed controlling drum of my controller.

In Figs. 1 and 2, there is shown a spring 15 which, incidentally, is quite powerful, and which operates to move the pedal 13 into its tilted position illustrated in Figs. 1 and 2. A rod 16 pivotally connected to the pedal 13 extends vertically and is adapted to control the reversing drum in a manner to be hereinafter set forth.

Pedal 14 which controls the brake and the speed drum of the controller, is connected to a vertically extending rod 17, through which it operates the speed controlling drum, as will be hereinafter set forth. There is also a spring (not shown) for operating the pedal 14. This spring is the spring which normally acts to apply the brake and also move the pedal 14 into its tilted position of Fig. 1, this spring being very powerful. Since it is well known to those skilled in the art and operates in the usual manner known in this art, it is not shown here.

In Figs. 1 and 2, the controller is shown as housed in a casing 18, and mounted at the right hand end of the casing 18 are a pair of handles 19 and 20, which are respectively the reversing and speed controlling handles. Also shown in Figs. 1 and 2 is a steering lever 21, adapted to operate the steering mechanism through a downwardly extending rod 22, as is well understood by those skilled in the art. Various other means are shown in Figs. 1 and 2, such as the horn 23, counterweights, and other usual devices which will be recognized by those skilled in the art.

Referring now to Fig. 10, I show a section through the speed drum. The reversing drum is shown in section in Fig. 7. I shall refer to Fig. 10 to describe the mounting of the contact segments and fingers of both drums. The reversing drum (Fig. 7) of the controller is maintained on a square shaft 24 having a circular bore 25 through which traverses a circular shaft 26 which is an extension of the speed drum supporting shaft. The speed supporting shaft is of the same square outline as the reversing drum supporting shaft 24 and is designated by the same reference numeral 24 in Fig. 10. The handle 19, or reversing handle, is of course secured to an extension 24a of the squared portion 24 of the reversing drum shaft, while the handle 20 is secured to the rod extension 26 of the speed drum shaft, as will be clear to those skilled in the art. In this way, the reversing drum and speed controlling drum handles may be mounted side by side, as shown in Fig. 3.

The speed controlling drum, and incidentally the reversing drum is constructed along the same lines as the speed controlling drum, comprises a series of pairs of V brackets 27 and 28 held together by bolts 29, as is quite apparent from viewing Fig. 10, and supporting the drum segments and other parts. The two brackets are separated from the shaft 24 through two layers 30 of insulation material, 27 and 28 of each pair, and actual commercial experience has shown this construction to be quite suitable and quite effective. On the V bracket 28 there is supported by an arm 31 an oil impregnated felt material 32 held in place by a screw bolt 33 cooperating with plates 34. It is the function of the oil impregnated felt material to lubricate the fingers 35 just prior to the contact by those fingers of the segments 36. Each segment 36 is secured in a conventional manner to an extending arm 37 of the V bracket 28.

The fingers 35 are all of the same construction and are formed of a very light material in U section. The flat of the U is designated by reference numeral 38, while the vertical faces are designated by reference numeral 39. An adjusting screw 40 is adapted to determine the degree of return movement and spring tensioning of each finger 35 relatively to a supporting U member 41 in which the U member 38, 39 is mounted in nested relation. For holding the screw 40 in any position to which it is moved, there is utilized a resilient finger piece 42 which cooperates with the flats of the screw head 40, as will be readily appreciated by those skilled in the art. The U member 41 supports a shaft 43 on which is mounted a spring 43a which tends to press the contact finger 35 against the drum.

The U member 38, 39 is notched as at 45 for cooperation with a rod 46 supported by the member 41, and is rotatable about that rod 46 while maintained assembled to the U member 41 through the said cooperative action of spring 43a. A pigtail 47 is riveted at 48 to the U member of the finger 35 and is secured at 49 for electrical contact through screw threaded rod 50, as will be readily appreciated by those skilled in the art. The finger supporting member 41 is secured to a wooden insulating block 51 by a series of screws 52. It is thought that the construction of the controller drums and the cooperating fingers will now be quite clear to those skilled in the art.

Referring now to Figs. 1, 3 and 7, I shall describe the means for operating the direction controlling drum, or reversing drum, as it is termed commercially. The handle 19 is secured to the extension 24a of the square shaft 24 and is adapted to rotate the shaft 24 and thus to rotate the brackets 27 and 28 supporting the contacts and felt lubricating members previously described. There are a pair of these V brackets 27 and 28 for each contact segment 36, and an extra pair of these brackets 27 and 28 are used for supporting the star wheel 55 which is movable integrally with the reversing drum itself.

The star wheel 55 has a depression 56 corresponding to a forward position, a depression 57 corresponding to a reverse position of the drum, and a further depression 58 corresponding to a neutral position of the drum. There is mounted within the controller casing 18 a shaft 59 supported in end bearings 60, and also in brackets 61 secured medially to the controller casing. This shaft 59 has pivotally supported thereon at its extreme right end a pair of spaced levers 62 carrying a detent roller 63 which cooperates with the depressions of the star wheel 55. A spring 64 is secured at one end to a lug 65 on the casing of the controller, and at its other end to a pin 66 on one of the levers 62. There are two of these springs, one secured to each of the levers 62. Those skilled in the art will readily appreciate that the detent roller 63 acts to hold the star wheel in any particular position in which it may be set, because of its cooperation with the depressions of the star wheel 55.

The star wheel 55 has a pair of lugs 67 cooperable with the shoulder 68 of a cam member 69 pinned at 70 to the extension of a rod 71. A spring 72 surrounding the rod 71 operates between a shoulder 70a on the cam member 69 and a shoulder 73 on the casing. The spring 72 serves to hold the cam member 69 in the position of Fig. 7 in which it cooperates with the two pins 67 on the star wheel 55 to maintain the star wheel in a position corresponding to a neutral position of the drum.

The strength of the spring 72 is such that manual manipulation of the controller drum by handle 19 is quite easy and will serve to depress the cam member 69 through pins 67 regardless of whether the controller is moved in a forward direction or in a reversing direction. Also, the tension of the spring 64 of the detent roller 63 is so calibrated that regardless of the pressure of spring 72, the detent roller 63 will maintain the controller, through its star wheel 55, in any position to which it is moved. However, once the detent roller 63 is removed from one of the depressions 56, 57, the spring 64 will preferably but not necessarily be of such strength as to return the star wheel to its neutral position, as illustrated in Fig. 7.

The rod 71 is hollow and houses therein a plunger 74 whose upper end 75 preferably terminates just short of the upper end of bored opening 76 in the said rod. The lower end of the plunger 74 is secured to the rod 16. When the pedal 13 is in its position of Fig. 1, the plunger 74 is in its position of Fig. 7. In this position of the parts, manual manipulation of the controller not only must compress spring 72, but must also force down the pedal 13 against the force of the very powerful spring 15. The combination of spring 15 with the spring 72 is such that should the controller be placed in any particular position by handle 19, it cannot be held in that position by the pressure of the detent roller 63.

Therefore, in order to facilitate manual manipulation of the drum through the lever 19, and in order to make it possible to maintain the drum in a particular directional position, it is necessary first to depress the pedal 13. The cam 69 may then be moved downwardly under the influence of the pins 67 without incidentally moving also the pedal 13 and the spring 15. Should the drum be so released for operation by the handle 19, and should the drum be placed in a particular position, and should the operator remove his foot from the pedal 13, the powerful spring 15 will lift pedal 13 to the position of Fig. 2, forcing the rod 16 and the plunger 74 against the end surface of the bore 76 of the rod 71. This will naturally cause the cam member 69 to move upwardly, forcing the detent roller 63 out of whichever depression it may be located at the time, and force the controller drum into its neutral position.

Preferably, but not necessarily, the relation of the plunger 74 to the bore 76 is such that the upper end 75 of the plunger will not quite contact the upper end of the bore 76 when the plunger 74 has been moved to its full upper position by the raising of pedal 13. This permits rod 71 and spring 72 to position the drum without the full force of spring 15 moving the drum forcefully against a stop. Thus, the plunger 74, while it imparts the initial movement to rod 71 necessary to move the detent roller 63 from one of the depressions 56 and 57, does not quite finish the movement of the rod 71 and cam 69, but allows the finishing movement to be accomplished under the influence of the relatively lighter spring 72. In this way, a somewhat cushioned action is obtained, as will be readily appreciated by those skilled in the art.

I shall now describe the means for operating the speed controller. The speed controller has secured thereto at its left hand end, a star wheel 80, as seen in Fig. 6. This star wheel is held in position on a specially prepared section of the square supporting rod 24, through means of bolt 81. The star wheel has of course a depression 82 corresponding to neutral position of the controller, and a series of further depressions corresponding to first, second, third and fourth speeds. Levers 83 pivoted on rod 59 and spring pressed by springs 84 carry a detent roller 85 which cooperates with the star wheel 80, just as the detent roller 63 and its supporting mechanism cooperate with the star wheel of the reversing drum.

The speed drum is of course adapted for actuation by the handle 20 which is secured to the circular rod 26 forming an extension of the square rod 24 supporting the drum and traversing the bored opening 25 in the square shaft 24 supporting the reversing drum. The speed drum is further operable by the pedal 14 through a series of connected means to be described hereinafter. These means include a rod 86 pivoted to the star wheel through pin 87. The rod 86 has a shoulder 88 against which fits the sleeve 89.

A spring 90 operates between the lower surface of the sleeve 89 and a fixed stop 91 in the casing and surrounds the circular extension 92 of the rod 86, which is adapted to pull the sleeve 89 downwardly against the compression of spring 90.

The lower end of the extension 92 of rod 86 passes through the guide sleeve 93 secured to the bottom of the controller, and terminates at 94. Just in advance of its terminal end 94, it has a series of drilled holes 95 which, through means of a pin 96, may support a collar 97. This collar may of course be held in any one of four positions, depending upon which hole 95 is selected for the pin 96. Surrounding the lower end of the rod 92 is a member 98 adapted to cooperate with the collar 97 and secured for integral movement with the rod 17 secured to the speed and brake pedal 14. It is quite obvious that the pedal 14 will pull on rod 17, which in turn will act through rod 98 to pull on collar 97, thus pulling rod 86 and its extension 92 downwardly against the compression of spring 90, and through pin 87 rotating the star wheel 80 and the controller drum from its neutral position of Fig. 6 to any speed position desired.

The function of the collar 97 is to permit the lazy action of the pedal 14 relatively to the controller necessary to allow for a fast release of the brake and also to vary the degree of motion contributed to the controller by the foot pedal 14 when that pedal is moved from its neutral and brake applying position of Fig. 2 to a full downward brake releasing position. It is obvious that when the collar 97 is in its position of Fig. 13, complete downward movement of the pedal 14 will not move the controller at all since the pedal 14 will have moved through its full movement before the member 98 contacts the collar 97. This construction is useful where, under certain conditions, it is undesirable to operate the controller through the foot, but in which it is desired to operate the controller through the hand lever 20.

Sometimes it is desirable to so adjust the controller that it is possible to inch the truck into a crowded space. Thus, where an operator is desirous of entering a freight car, for instance, he wishes to have the truck move slowly and through extremely short distances, so that he can manipulate it carefully. In such a case, the collar 97 may be moved up one notch from the position of Figs. 12 and 13. Then, full depression of the pedal 14 will merely move the controller from neutral to first speed, and the operator may, by repeated up and down movements of the pedal 12, gradually inch the truck into the freight car or other crowded space.

As was indicated previously, there is a very powerful brake applying spring which urges the pedal 14 into its position of Fig. 1. Therefore, were the operator to take his foot off the pedal 14 with the pedal in depressed position, the full force of this powerful spring would normally be exerted against the controller to return it to its neutral position. The action would be extremely harsh and undesirable. To avoid such action, I have provided rather novel means, which I shall now describe.

In the first place, referring to Figs. 12 and 13, it will be noted that the rod 92 has pivoted thereto at point 98 a dog 99, spring pressed outwardly by a spring 100 so that its lower end 101 will cooperate with the upper face 102 of the member 98. When the pedal 12 is released, the rod 17 will move the member 98 upwardly exerting a force against surface 104 moving rod extension 92 upwardly, to move the controller to a neutral position. When the cam surface 93a of the sleeve 93 strikes the cam surface 99a of the dog 99, it will, however, cam that dog inwardly into the slot 92a of the rod extension 92 and will permit a by-passing of the member 98 relatively to the rod extension 92 thereafter. Therefore, it is quite apparent that the force of the spring behind the pedal 14 will be applied only for a short distance sufficient to give the required momentum to the rod extension 92 of rod 86 to overcome the inertia of the controller against movement from any position in which it is held, by coaction between the detent roller 85 and one of the speed depressions of the star wheel 80.

The release of the pedal 14 from the controller through the camming of the dog 99 as the controller is being returned to neutral position is necessary also to permit the further movement of the pedal 14 incidental to the application of the brake as was previously generally indicated.

At the point of the release of the powerful pedal action relatively to the rod 86, the spring 90 alone acts to return the controller through the sleeve 89 and the shoulder 88 of the rod 86 to complete the movement of the star wheel and the controller. Even this movement is so fast that it is undesirable, and I prefer rather to ease the controller into neutral position. I have therefore arranged for a dog 103 to stop the spring pressed movement of the sleeve 89 just when the star wheel 80 comes under the influence of detent roller 85 cooperating with the depression 82 corresponding to the neutral position of the star wheel. Since the force of spring 90 is cut off by the dog 103 at this point, the detent roller 85 cooperating with the peculiarly shaped depression 82 of the star wheel, will gradually ease the star wheel into its neutral position under the influence of springs 84, as will be clearly understood by those skilled in the art.

The dog 103 is pivoted on the pivot shaft 104 supported by bracket 105, and has a pair of lever arms 106 cooperating with the upper surface of the sleeve 89. It has a vertical stop finger 107 cooperating with a surface of the star wheel, so that as the star wheel moves to neutral position, it acts on the arm 107, forcing the arms 106 against the sleeve 89 and holding the sleeve against full upward spring pressed movement. This action and its function in slowing down the operation of the controller in its return to neutral position, it is thought will be clearly understood from the description now given.

It will be well at this point to indicate that while the speed controller is operable both by a manual means and a foot pedal, the foot pedal is in supreme control and may at all times overcome the manual means.

For interlocking the reverse or direction determining controller and the speed controller, I utilize a construction which is quite well known in the art, and which embodies a cam 110 secured for integral movement with the direction controller, as illustrated in Fig. 8, and a further cam 111 secured for integral rotation with the speed controller. Each of these cams is secured to the square rod of its particular controller, just as the contact segments are secured, by V brackets 27 and 28. The cam member 110 has a notch 112 therein with which cooperates a dog 113 pivoted on the transverse rod 61. The dog 113 is always held in the notch 112 of the cam 110 of the direction determining or reversing controller, unless the cam 111 is so placed that its high point will force the dog 113 out of the notch 112. The high point of cam 111 will not be in this position unless the speed controlling drum is in a neutral position. Therefore, it is quite obvious that the reversing drum cannot be manipulated in any way whatsoever unless the speed drum is in a neutral position. The particular construction is well known in this art and need not be described further.

Referring now to Figs. 4 and 5, I illustrate the circuits and the wiring diagram of my controller. Reference numeral 115 represents the armature of my driving motor, while reference numeral 116 indicates the fields. A resistor is designated by reference numeral 117, and the battery of the truck is represented by reference numeral 118. The various forward and reverse circuits are all seen in Fig. 5, and those skilled in the art will require no further description.

While I have indicated in my specification the particular construction of a preferred modification of my controller, it should be understood that the basic and important features of the invention may be obtained through the use of various modifications of the construction I have shown, and modifications will readily occur to those skilled in the art. Therefore, the claims appended hereto should be given a relatively broad and liberal interpretation, such as is necessary to afford applicant the protection to which he is entitled under the patent law.

I claim:

1. In an electric controller of the class described, a reversing controller, spring pressed detent means adapted to hold it yieldingly in positions corresponding to forward and reverse, spring pressed means tending to return said controller to neutral from either of its positions, but of such strength as to be incapable of releasing said spring pressed detent means, and additional spring pressed foot controlled means for applying pressure to said first spring pressed means to release said controller from said detent means whereupon said first spring pressed means will return said controller to neutral.

2. In an electric controller of the class described, a reversing controller, spring pressed detent means adapted to hold it yieldingly in positions corresponding to forward and reverse, spring pressed means tending to return said controller to neutral from either of its positions, but of such strength as to be incapable of releasing said spring pressed detent means, and additional spring pressed means adapted to assist said first spring pressed means to release said controller from said detent means and return said controller to neutral, and a foot operated pedal adapted to maintain said additional spring pressed means in inoperative position.

3. In an electric controller of the class described, a speed controller having a plurality of speed positions, a foot pedal having connection with said controller for moving said controller from a neutral to a particular speed position as said pedal is depressed, and adjustable means for determining the speed position to which said controller is moved by the depression of said pedal to a predetermined stop position.

4. In an electric controller of the class described, a speed controller having a plurality of speed positions, spring pressed means maintaining said controller in a neutral position, a foot pedal having connection with said controller for moving said controller against said spring pressure from a neutral to a particular speed position as said pedal is depressed, and adjustable means for determining the speed position to which said controller is moved by the depression of said pedal to a predetermined stop position.

5. In an electric controller of the class described, a speed controller having a plurality of speed positions, a foot pedal having connection with said controller for moving said controller from a neutral to a particular speed position as said pedal is depressed, and adjustable means for determining the degree of motion of said controller contributed by full movement of said pedal, whereby full movement of said pedal may be utilized to move said controller to any one of a plurality of speed positions.

6. In an electric controller of the class described, a speed controller having a plurality of speed positions, a pull rod secured to said controller for rotating the same as said rod is pulled, a foot pedal, a rod secured to said foot pedal, a collar on said first rod adapted to be contacted by said foot pedal rod whereby to pull said first rod and rotate said controller, and means for securing the collar in one of several positions to vary the motion contributed to said first rod and controller by said pedal operated rod.

7. In an electric controller of the class described, a speed controller having a plurality of speed positions, spring pressed means for returning said controller to a neutral position from any speed position, and cam operated means for releasing said controller from the action of said spring pressed means, once predetermined motion in a neutral direction has been imparted to said controller by said means.

8. In an electric controller of the class described, a speed controller having a plurality of speed positions, spring pressed means for returning said controller to a neutral position from any speed position, a dog through which said spring pressed means act on said controller, means for camming said dog into a position to release the controller from the action of said spring pressed means once predetermined motion is imparted to said controller by said means, whereby said spring pressed means may go beyond said release position independently of said controller where such movement is required.

9. In an electric controller of the class described, a speed controller having a plurality of speed positions, spring pressed detent means for yieldingly maintaining said controller in any one of a plurality of positions including neutral, spring pressed means adapted to return said controller to neutral position, and means for relieving the spring pressure on said means when said spring pressed detent means engages said controller in approximately its neutral position, whereby said detent means ease the controller into its neutral position without the incidental sharp return of the controller against a neutral stop by said spring pressed means.

10. In an electric controller of the class described, a speed controller having a plurality of speed positions, a star wheel having a series of depressions corresponding to neutral and different speeds, and fixed for rotation with said controller, a spring pressed roller cooperable with said depressions for yieldingly maintaining said controller in any position to which it is moved, a rod connected to said controller, a spring pressing on said rod to urge the same to rotate the controller into neutral position, and means for relieving the spring pressure on said rod just as the spring pressed roller enters the star wheel depression corresponding to neutral position of said controller, whereby said roller will thereafter ease said controller into its neutral position without the incidental sharp return of the controller against a neutral stop by said spring pressed rod.

11. In an electric controller of the class described, a speed controller having a plurality of speed positions, a star wheel having a series of depressions corresponding to neutral and different speeds, and fixed for rotation with said controller, a spring pressed roller cooperable with said depressions for yieldingly maintaining said controller in any position to which it is moved, a rod connected to said controller, a spring pressing on said rod to urge the same to rotate the controller into neutral position, and means for relieving the spring pressure on said rod just as the spring pressed roller enters the star wheel depression corresponding to neutral position of said controller, whereby said roller will thereafter ease said controller into its neutral position without the incidental sharp return of the controller against a neutral stop by said spring pressed rod, and a foot operated treadle for moving said rod against its spring pressure to rotate said controller to various speed positions.

12. In an electric controller of the class described, a speed controller having a plurality of speed positions and a neutral position, a spring pressed detent means for easing said controller into its neutral position, and a spring pressed member for moving said controller into a position in which it comes under the control of said detent means.

13. In an electric controller of the class described, a speed controller having a plurality of speed positions and a neutral position, a spring pressed detent means for easing said controller into its neutral position, a spring pressed member for moving said controller into a position in which it comes under the control of said detent means, and means for relieving the spring pressure on said member once it has moved the controller into the position in which it is controlled by said detent.

14. In an electric controller of the class described, a speed controller having a plurality of speed positions and a neutral position, a spring pressed detent means for easing said controller into its neutral position, a spring pressed member for moving said controller into a position in which it comes under the control of said detent means, means for relieving the spring pressure on said member once it has moved the controller into the position in which it is controlled by said detent, and means for controlling the action of said spring pressed member operable by a foot treadle.

15. In an electric controller of the class described, a speed controller, a handle adapted for integral movement with said speed controller to move it from a neutral position to various speed positions, a foot pedal also connected to said controller and adapted when depressed by foot pressure to move said controller from a neutral position to various speed positions, and a spring resisting the depression of said pedal and sufficiently powerful to impel the return of said controller to neutral position when said pedal is relieved from foot pressure, regardless of the positioning of said controller by said handle.

16. In an electric controller of the class described, a speed controller, a handle adapted for integral movement with said speed controller to move it from a neutral position to various speed positions, a foot pedal also connected to said controller and adapted when adjusted by foot pressure to move said controller from a neutral position to various speed positions, and adjustable means for varying the speed position to which depression of said foot pedal will move said controller.

17. In an electric controller of the class described, a speed controller, a handle adapted for integral movement with said speed controller to move it from a neutral position to various speed positions, and a foot pedal also connected to said controller and adapted when depressed by foot pressure to move said controller from a neutral position to various speed positions.

18. In an electrical controller of the class described, a shaft, a controller rotatable with said shaft from a neutral position to various speed positions, a foot pedal, a rod pivotally secured to said foot pedal and said controller whereby foot pressure applied to said pedal will rotate said controller from a neutral position to any one of said various speed positions, and a spring adapted to return said controller to a neutral position when foot pressure is withdrawn from said foot pedal.

19. In an electric industrial truck, a driver's platform, a foot pedal pivoted to said platform and connected with the braking mechanism and adapted to occupy an upward tilted position when the braking mechanism is applied, and to relieve the application of the braking mechanism when depressed, a controller casing above said platform, a controller mounted for rotary movement in said casing from a neutral position to any one of several speed positions, and a rod connecting said controller to said foot pedal whereby depression of said foot pedal to release the brake application will also move said controller to a selected speed position.

20. In an electric industrial truck, a driver's platform, a foot pedal pivoted to said platform and connected with the braking mechanism and adapted to occupy an upward tilted position when the braking mechanism is applied, and to relieve the application of the braking mechanism when depressed, a controller casing above said platform, a controller mounted for rotary movement in said casing from a neutral position to any one of several speed positions, and a rod connecting said controller to said foot pedal whereby depression of said foot pedal to release the brake application will also move said controller to a selected speed position, there being a lazy connection between said rod and pedal to permit brake releasing movement of said pedal prior to rotation of the controller thereby.

21. In a controller of the class described, a square shaft, V shaped bracket members having offset portions carrying controller segments and secured in opposed pairs to said shaft, felt members impregnated with oil carried by said V members for rotation in substantially the same rotary path as said segments, and contact fingers secured to a stationary support and cooperable with said segments and with said impregnated felt members as said shaft is rotated.

CHARLES SCHROEDER.